US012776424B2

(12) United States Patent
Ross et al.

(10) Patent No.: US 12,776,424 B2
(45) Date of Patent: Oct. 27, 2026

(54) METHODS AND APPARATUSES FOR OPTICAL STABILIZATION OF STRAY CHARGE ENVIRONMENT

(71) Applicant: IonQ, Inc., College Park, MD (US)

(72) Inventors: Aaron Michael Ross, Washington, DC (US); Adam Daniel West, Bowie, MD (US); Jonathan Albert Mizrahi, Silver Spring, MD (US); Kevin Antony Landsman, Rockville, MD (US); Michael Lurie Goldman, University Park, MD (US)

(73) Assignee: IonQ, Inc., College Park, MD (US)

( * ) Notice: Subject to any disclaimer, the term of this patent is extended or adjusted under 35 U.S.C. 154(b) by 361 days.

(21) Appl. No.: 18/436,729

(22) Filed: Feb. 8, 2024

(65) Prior Publication Data

US 2025/0166863 A1 May 22, 2025

Related U.S. Application Data

(60) Provisional application No. 63/484,094, filed on Feb. 9, 2023.

(51) Int. Cl.

*G21K 1/14* (2006.01)
*G06N 10/40* (2022.01)
*G21K 1/20* (2026.01)

(52) U.S. Cl.

CPC ............... *G21K 1/14* (2013.01); *G06N 10/40* (2022.01); *G21K 1/20* (2026.01)

(58) Field of Classification Search

CPC ............. G21K 1/14; G21K 1/20; G06N 10/40
See application file for complete search history.

(56) References Cited

U.S. PATENT DOCUMENTS

2005/0059138 A1* 3/2005 Vitaliano ............... G06N 10/70 372/1
2020/0219001 A1* 7/2020 Kim ........................ G06N 10/40
2022/0067565 A1* 3/2022 Blumel .................. G06N 10/00
2022/0101166 A1* 3/2022 Blumel .................. G06N 10/00
2022/0120629 A1* 4/2022 Pisenti .................... G01L 21/30
2022/0262929 A1* 8/2022 Hughes .................... G21K 1/00
2023/0032929 A1* 2/2023 Goldman ............... G06N 10/40
2023/0122145 A1* 4/2023 Uys ........................ G06N 10/40 250/492.1
2023/0131053 A1* 4/2023 Uys ........................ G06N 10/20 702/186
2023/0132301 A1* 4/2023 Debnath ................ G06N 10/40 356/301
2023/0140906 A1* 5/2023 Goldman ............... G06N 10/40 324/304

(Continued)

*Primary Examiner* — David A Vanore
(74) *Attorney, Agent, or Firm* — ARENTFOX SCHIFF LLP

(57) ABSTRACT

Aspects of the present disclosure may include a method and/or a system for selecting a wavelength for a saturation beam, selecting a first intensity for the saturation beam, emitting the saturation beam at the first intensity, at an angle with respect to a surface of an ion trap, toward the surface of the ion trap, wherein the ion trap includes a plurality of trapped ions associated with a quantum information processing (QIP) system, and performing a first computation based on the plurality of trapped ions during an emission of the saturation beam at the first intensity.

20 Claims, 5 Drawing Sheets

(56) References Cited

U.S. PATENT DOCUMENTS

| | | | | |
|---|---|---|---|---|
| 2023/0213988 | A1* | 7/2023 | Debnath | G06F 1/206 250/489 |
| 2024/0004093 | A1* | 1/2024 | Goldman | G01T 5/00 |
| 2024/0022335 | A1* | 1/2024 | Pisenti | G02F 3/00 |
| 2024/0211789 | A1* | 6/2024 | Uys | G06N 10/40 |
| 2024/0330732 | A1* | 10/2024 | Pisenti | G06N 10/40 |
| 2024/0428109 | A1* | 12/2024 | Welte | G06N 10/40 |
| 2025/0037896 | A1* | 1/2025 | Welte | G06N 10/40 |
| 2025/0103936 | A1* | 3/2025 | Welte | G06N 10/40 |
| 2025/0124322 | A1* | 4/2025 | Sage | G06N 10/40 |
| 2025/0151637 | A1* | 5/2025 | Siverns | G06N 10/00 |
| 2025/0166863 | A1* | 5/2025 | Ross | G21K 1/14 |

* cited by examiner

METHODS AND APPARATUSES FOR OPTICAL STABILIZATION OF STRAY CHARGE ENVIRONMENT

CROSS-REFERENCE TO RELATED APPLICATION

The current application claims priority to, and the benefit of, U.S. Provisional Application No. 63/484,094 filed on Feb. 9, 2023 and entitled "METHODS AND APPARATUSES FOR OPTICAL STABILIZATION OF STRAY CHARGE ENVIRONMENT," the contents of which are hereby incorporated by reference in their entireties.

BACKGROUND

A quantum information processing (QIP) system may utilize trapped ions as qubits to store the states of the computations for the QIP system to function accurately. The states of trapped ions may be sensitive to many environmental noises that may undesirably alter the states. For example, stray field caused by accumulated charges near the trapped ions may degrade the fidelity of the qubit states. Therefore, improvement may be desirable.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure may include a method and/or a system for selecting a wavelength for a saturation beam, selecting a first intensity for the saturation beam, emitting the saturation beam at the first intensity, at an angle with respect to a surface of an ion trap, toward the surface of the ion trap, wherein the ion trap includes a plurality of trapped ions associated with a quantum information processing (QIP) system, and performing a first computation based on the plurality of trapped ions during an emission of the saturation beam at the first intensity To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
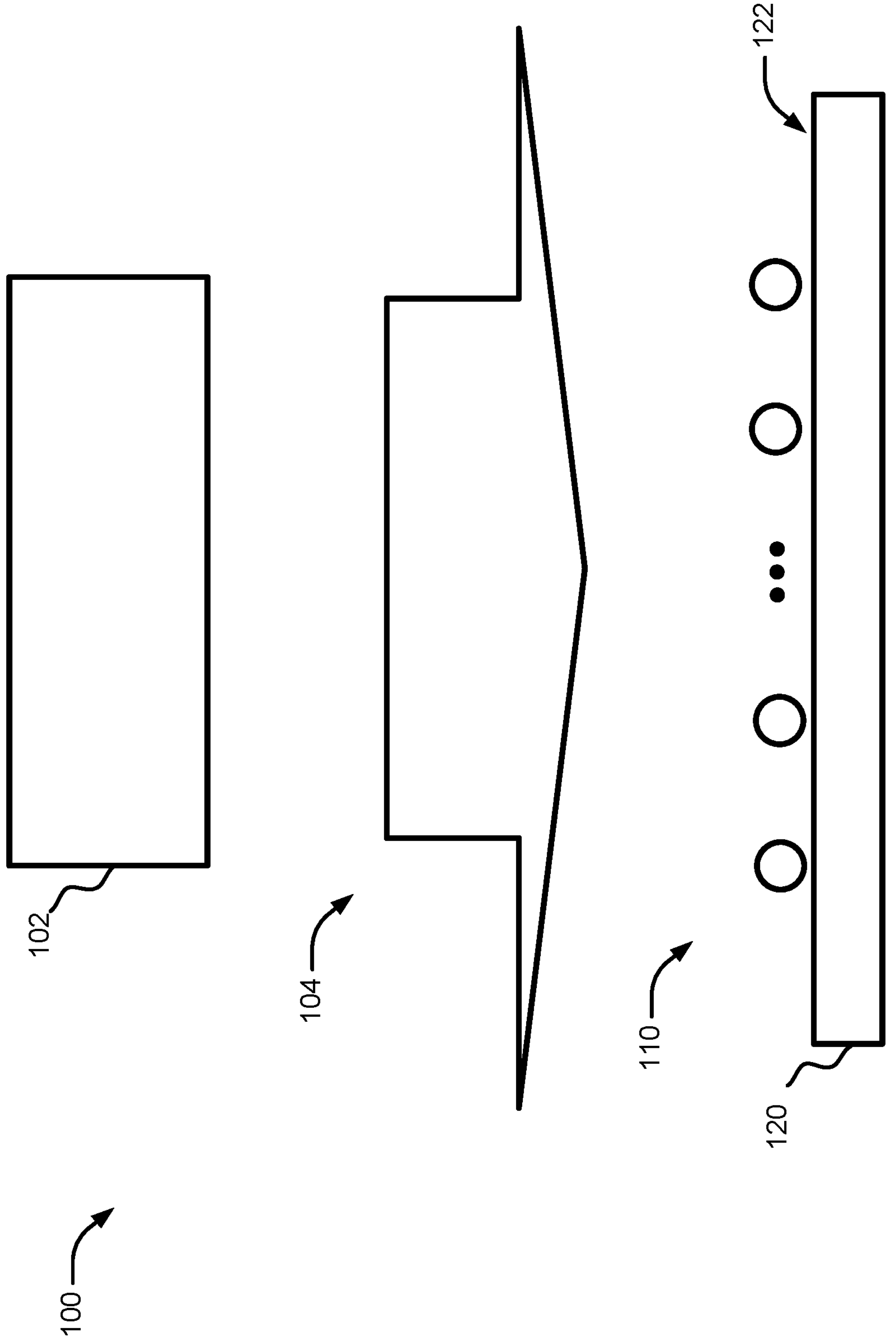
FIG. 1 illustrates an example of a scheme for mitigating stray field according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The operation of a trapped-ion quantum information processing (QIP) system is sensitive to the presence of stray accumulated charge in the vicinity (e.g., within tens of microns to several millimeters) of the trapped ions. These charges may produce stray electric fields that may shift the positions of the ions in the trap and/or the frequencies of the collective motional modes of the ion chain, either of which may degrade the fidelity of operations of the QIP system.

These stray charge distributions may be created, for example, when stray light is incident on a surface on or near the ion trap, which may cause the local ejection of electrons from that surface. This may cause a local positive charge to accumulate where the electrons were ejected or a local negative charge to accumulate where they land, depending on the specific properties of the materials involved. This optically-induced charging may be particularly detrimental to the operations of the QIP system if the accumulated charge dissipates on a timescale comparable to or faster than the typical time required to run a set of calculations. In this case, the charge environment may shift dynamically during a set of calculations in response to the specific set of beam powers, positions, and/or pulse durations implemented for those calculations. Because the behavior of subsequent operations is dependent on the specific previous operations performed, this creates a "context-dependent" shift in experimental parameters that may be difficult to eliminate through calibration.

In some aspects, there are few strategies that may mitigate the problem above. In a first aspect, care may be taken to eliminate most or all surfaces that may be capable of holding an accumulated charge from the vicinity of the ions, or at least shielding these surfaces so that any charge that accumulates on them does not produce an appreciable electric field at the ions' location. These considerations are already weighted heavily when choosing materials and geometries for ion traps and their associated components, but this design process is highly complex and must balance several competing requirements (e.g., costs, size, maintenance complexity, etc.).

Moreover, even an ion trap designed according to the method above is susceptible to the deposition of surface contamination, either before or during operation. After the deposition of surface contamination, the surfaces may be susceptible to charge accumulation. Such accumulation may occur for traps that operate at cryogenic temperatures, where any background gas may condense onto the trap surface. While this condensed gas may be removed, at least temporarily, by thermally cycling the entire cryogenic apparatus, such an operation may be extremely costly in terms of lost time. Other contaminants may be cleaned in-situ by the application of a beam of high-energy ions to the trap surface, but the apparatus that produces such a beam would need to be integrated as a permanent part of the vacuum system, adding an additional, if not prohibitive, degree of complexity.

Alternatively, in a second aspect, care may be taken to avoid any unwanted scattering of light, from the Raman or other beams, onto the trap surface. The various optical systems may be designed so that their respective beams are as aberration-free as possible and pass through the vacuum apparatus with minimal clipping on the trap or other surfaces that would lead to scatter. However, as with trap design, this design process may be complex, and must balance several competing requirements. Moreover, with increased complexity of the various optical systems, it may be difficult to eliminate all unwanted sources of stray light, including reflections from various optical surfaces, that could give rise to charging.

In a third aspect, the Raman beams may be applied in such a way that this charging effect is static during measurements. For instance, the Raman beams may be applied at high power over a range of positions before all measurements to establish a uniform charge environment that remains stable over the course of the measurement. However, this approach may not work if the charge dissipation time is not long compared to the typical measurement length, and it imposes additional costs in terms of Raman power and experimental duty cycle.

Aspects of the present disclosure include applying a saturation beam to maintain a static stray charge environment in the vicinity of the ions. In certain circumstances, the magnitude of the charging effect may be saturated as more light is applied to a surface. In other words, after a certain intensity of surface illumination is achieved, any additional scatter onto the surfaces induces only a minimal shift in the local charge environment. The saturation beam is intended to achieve this saturation level of surface illumination so that the charge environment is insensitive to incidental scatter from the other beams that are involved in performing operations.

In certain aspects of the present disclosure, the saturation beam may be applied broadly and/or uniformly to the surface of the trap in the vicinity of the ions and/or to any other surface that is found to be accumulating charge to which the ions are sensitive. The saturation beam may be applied during the operation of the QIP system to maintain a static charge environment irrespective of the computations that are being performed. The wavelength of the saturation beam may be selected to minimize interactions with the ions. The unwanted impacts (e.g., small light shifts or a higher background level while performing readout at the end of the measurement) caused by the saturation beam may be quantified and addressed using various technical means.

In one implementation, the saturation beam may be applied at an angle of incidence that is normal (i.e., 90°) or substantially normal to the trap surface, which may enable the saturation beam to provide illumination uniformly across a broad area of the trap. A trapped-ion quantum computer may contain at least one optical system oriented in the normal direction, so this optical system may often be adapted to apply the saturation beam. Because there is no strict requirement on the wavelength of the saturation beam—only that it induce a charge response from the surface under illumination but interact negligibly with the ions—the beam may be integrated into the optical system using dichroic beam-splitters and/or other means with a minimum of additional technical complexity.

The power of the saturation beam may be set by measuring the intensity at which the measurable charge response of the ions saturates. If the beam is found to induce undesirable effects that reduce the fidelity of calculations, the beam intensity may be modulated dynamically through the use of laser diode current modulation, an acousto-optic modulator, and/or other conventional techniques. In this way, the need to maintain a constant charge environment may be balanced against the need to protect certain sensitive portions of the measurement sequence from the unwanted effects of the saturation beam.

FIG. 1 illustrates an example of a configuration 100 for reducing stray field according to aspects of the present disclosure. In some aspects, the configuration 100 may include a light source 102 configured to emit a saturation beam 104. The saturation beam 104 may be configured to impinge on to a surface 122 of a trap 120 for an ion chain 110 used in a QIP system. The light source 102 may be configured to emit saturation beam 104 at substantially an angle normal to the surface 122 of the trap 120.

In certain aspects of the present disclosure, the intensity of the saturation beam 104 may be tuned such that the saturation beam 104 causes the charges on the surface 122 to reach a steady state (i.e., maintaining a static charge environment). An increase in intensity of the saturation beam 104 may lead to negligible increase in charges on the surface 122 (e.g., increase that does not induce stray field which may degrade the fidelity of the trapped ions in the ion chain 110).

In some aspects, the wavelength of the saturation beam 104 may be selected such that the saturation beam 104 has minimal interaction with the trapped ions in the ion chain 110. For example, the saturation beam 104, when illuminating the ion chain 110, may not change the states of the trapped ions in the ion chain 110 or drive light shifts between the qubit states.

In an aspect of the present disclosure, any negative impact to the trapped ions in the ion chain 110 caused by the saturation beam 104 may be quantified and/or mitigated. For example, if the saturation beam 104 causes a phase shift $\Delta\varphi$ to the trapped ions in the ion chain 110, a counter beam (e.g., a global beam or an individual Raman beam) may be applied to cancel out the phase shift $\Delta\varphi$.

In some aspects of the present disclosure, the intensity of the saturation beam 104 may be adjusted based on the calculations being performed in the ion chain 110. For example, the light source 102 may emit the saturation beam 104 at a first intensity during a first computation associated with the ion chain 110, and emit the saturation beam 104 at a second intensity during a second computation associated with the ion chain 110.

Figure 2:
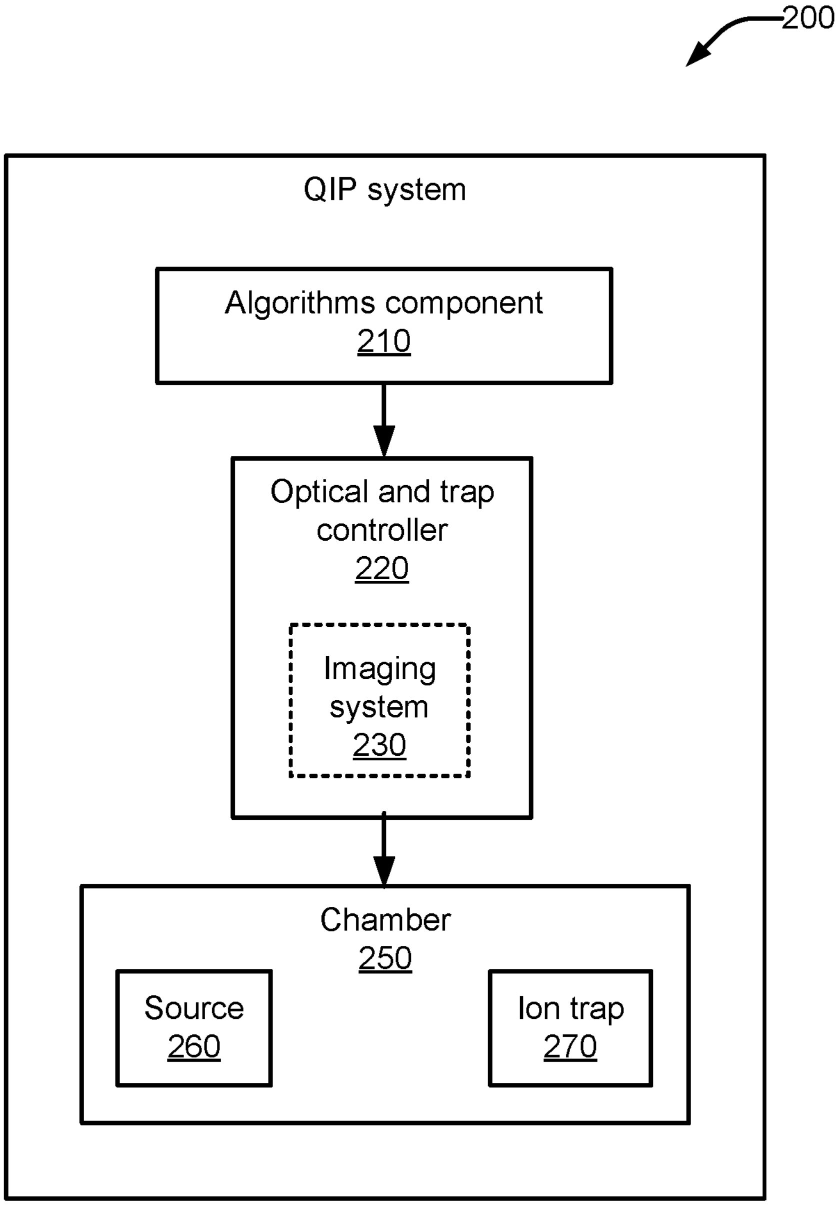
FIG. 2 illustrates an example of a QIP system according to aspects of the present disclosure.

FIG. 2 is a block diagram that illustrates an example of a QIP system 200 in accordance with aspects of this disclosure in which the techniques described above for a dual-space, single species trapped-ion architecture can be implemented. The QIP system 200 may also be referred to as a quantum computing system, a computer device, a trapped ion system, or the like.

The QIP system 200 can include a source 260 that provides atomic species (e.g., a plume or flux of neutral atoms) to a chamber 250 having an ion trap 270 that traps the atomic species once ionized (e.g., photoionized). The ion trap 270 may be part of a processor or processing portion of the QIP system 200. The source 260 may be implemented separate from the chamber 250.

The imaging system 230 can include a high-resolution imager (e.g., CCD camera) for monitoring the atomic ions while they are being provided to the ion trap or after they have been provided to the ion trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

The QIP system 200 may also include an algorithms component 210 that may operate with other parts of the QIP system 200 (not shown) to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations.

Figure 3:
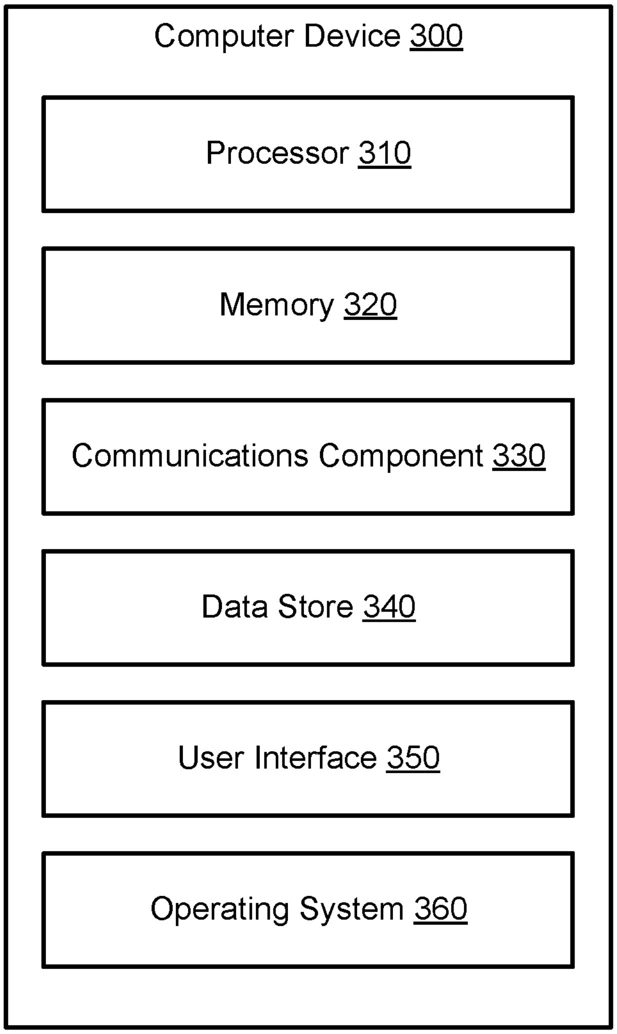
FIG. 3 illustrated an example computer system or device in accordance with aspects of the disclosure.

Referring now to FIG. 3, illustrated is an example computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or a combination of quantum and classical computing functions. For example, the computer device 300 may be used to process information using quantum algorithms based on trapped ion technology and may therefore implement the dual-space, single species architecture described herein. A generic example of the computer device 300 as a QIP system is illustrated in the QIP system 200 shown in FIG. 2.

In one example, the computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include a central processing unit (CPU), a quantum processing unit (QPU), a graphics processing unit (GPU), or combination of those types of processors. In one aspect, the processor 310 may refer to a general processor of the computer device 300, which may also include additional processors 310 to perform more specific functions such as functions for individual beam control.

In an example, the computer device 300 may include a memory 320 for storing instructions executable by the processor 310 for carrying out the functions described herein. In an implementation, for example, the memory 320 may correspond to a computer-readable storage medium that stores code or instructions to perform one or more of the functions or operations described herein. Just like the processor 310, the memory 320 may refer to a general memory of the computer device 300, which may also include additional memories 320 to store instructions and/or data for more specific functions such as instructions and/or data for individual beam control.

Further, the computer device 300 may include a communications component 330 that provides for establishing and maintaining communications with one or more parties utilizing hardware, software, and services as described herein. The communications component 330 may carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices.

Additionally, the computer device 300 may include a data store 340, which can be any suitable combination of hardware and/or software, which provides for mass storage of information, databases, and programs employed in connection with implementations described herein. For example, the data store 340 may be a data repository for operating system 360 (e.g., classical OS, or quantum OS). In one implementation, the data store 340 may include the memory 320.

The computer device 300 may also include a user interface component 350 operable to receive inputs from a user of the computer device 300 and further operable to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof.

In an implementation, the user interface component 350 may transmit and/or receive messages corresponding to the operation of the operating system 360. In addition, the processor 310 may execute the operating system 360 and/or applications or programs, and the memory 320 or the data store 340 may store them.

When the computer device 300 is implemented as part of a cloud-based infrastructure solution, the user interface component 350 may be used to allow a user of the cloud-based infrastructure solution to remotely interact with the computer device 300.

Figure 4:
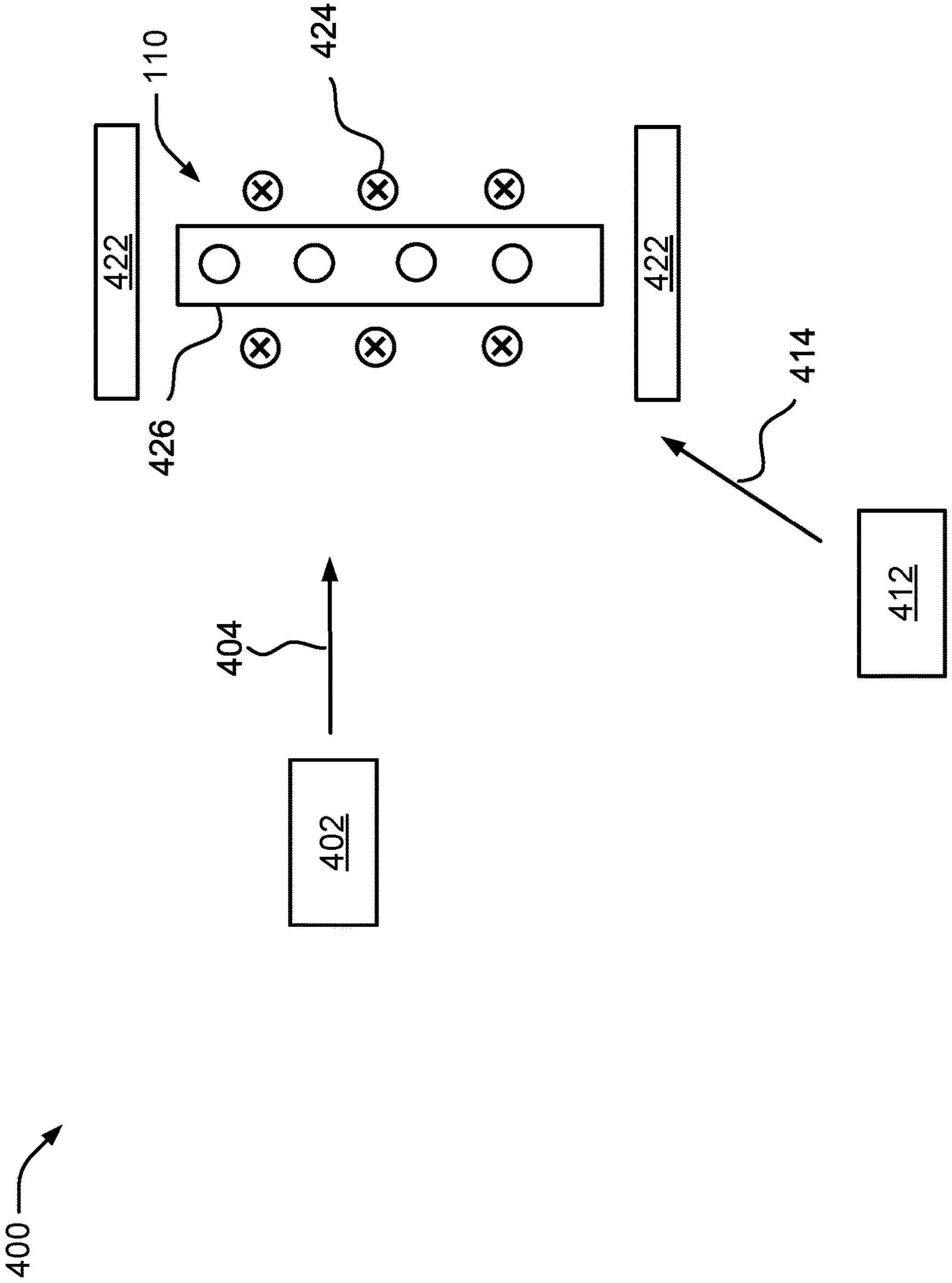
FIG. 4 illustrates an example of a control system configured to control the ion chain according to aspects of the present disclosure.

FIG. 4 illustrates an example of a control system 400 configured to control the ion chain 110 according to aspects of the present disclosure. The control system 400 may be an example configuration of a QIP system, such as the QIP system 200. The control system 400 may include the hardware associated with controlling the trapped ions in a QIP system.

In some aspects, the control system 400 may include first light source 402 configured to emit a global optical beam 404 toward the ion chain 110. The control system 400 may include a second light source 412 configured to emit individual Raman beams toward the ion chain 110. The control system 400 may include a magnetic system 422 configured to apply a magnetic field 424 across the ion chain 110. The magnetic system 422 may be configured to apply the magnetic field 424 perpendicularly across the axis of the ion chain 110. The control system 400 may include a biasing system 426 configured to apply one or more of a direct current (DC) and/or a radio frequency (RF) bias on the ion chain 110. The biasing system 426 may include one or more electrodes configured to apply DC and/or the RF fields. In some aspects, the biasing system 426 may trap one or more ions in the ion chain 110.

Figure 5:
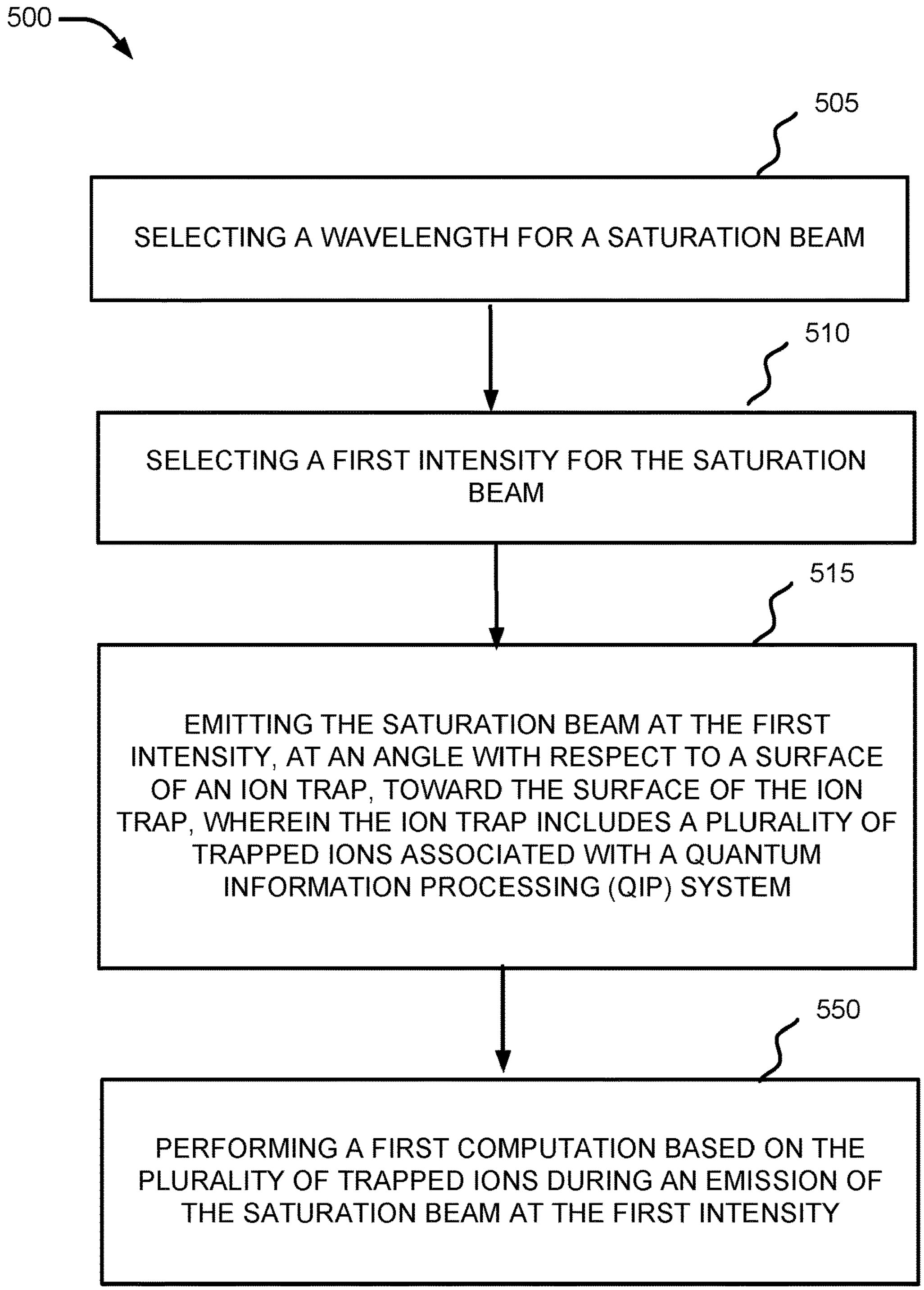
FIG. 5 illustrates an example of a method for mitigating stray field using a saturation beam according to aspects of the present disclosure.

FIG. 5 illustrates an example of a method 500 for mitigating stray field using a saturation beam according to aspects of the present disclosure. The method 500 may be performed by one or more of the QIP system 200, the computer device 300, the control system 400, and/or one or more subcomponents of the QIP system 200, the computer device 300, or the control system 400.

At 505, the method 500 may select a wavelength for a saturation beam. For example, one or more of the optical and trap controller 220, the algorithm component 210, and/or the processor 310 may select a wavelength for a saturation beam.

At 510, the method 500 may select a first intensity for the saturation beam. For example, one or more of the optical and trap controller 220, the algorithm component 210, and/or the processor 310 may select a first intensity for the saturation beam.

At 515, the method 500 may emit the saturation beam at the first intensity, at an angle with respect to a surface of an ion trap, toward the surface of the ion trap, wherein the ion trap includes a plurality of trapped ions associated with a quantum information processing (QIP) system. For example, one or more of the first light source 402 and/or the second light source 412 may emit the saturation beam at the first intensity, at an angle with respect to a surface of an ion trap, toward the surface of the ion trap, wherein the ion trap includes a plurality of trapped ions associated with a quantum information processing (QIP) system.

At 520, the method 500 may perform a first computation based on the plurality of trapped ions during an emission of the saturation beam at the first intensity. For example, one or more of the optical and trap controller 220, the algorithm component 210, and/or the processor 310 may perform a first computation based on the plurality of trapped ions during an emission of the saturation beam at the first intensity.

Aspects of the present disclosure may include a method and/or a system for selecting a wavelength for a saturation beam, selecting a first intensity for the saturation beam, emitting the saturation beam at the first intensity, at an angle with respect to a surface of an ion trap, toward the surface of the ion trap, wherein the ion trap includes a plurality of trapped ions associated with a quantum information processing (QIP) system, and performing a first computation based on the plurality of trapped ions during an emission of the saturation beam at the first intensity Aspects of the present disclosure include the method and/or system above, further comprising selecting a second intensity for the saturation beam, wherein the second intensity is different than the first intensity, emitting the saturation beam at the second intensity, and performing a second computation based on the plurality of trapped ions during the emission of the saturation beam at the second intensity.

Aspects of the present disclosure include any of the methods and/or systems above, wherein selecting the wavelength comprises selecting the wavelength such that the emission of the saturation beam does not degrade a fidelity of the first computation based on the plurality of trapped ions of the QIP system.

Aspects of the present disclosure include any of the methods and/or systems above, wherein selecting the first intensity comprises selecting the first intensity such that the emission of the saturation beam does not degrade a fidelity of the first computation based on the plurality of trapped ions of the QIP system.

Aspects of the present disclosure include any of the methods and/or systems above, wherein the angle is 90° from the surface of the ion trap.

Aspects of the present disclosure include any of the methods and/or systems above, further comprising measuring an unwanted effect associated with the emission of the saturation beam and applying a counter light beam to reduce or eliminate the unwanted effect based on the measurement.

Aspects of the present disclosure include any of the methods and/or systems above. The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of reducing stray field, comprising:
selecting a wavelength for a saturation beam;
selecting a first intensity for the saturation beam;
emitting the saturation beam at the first intensity, at an angle with respect to a surface of an ion trap, toward the surface of the ion trap, wherein the ion trap includes a plurality of trapped ions associated with a quantum information processing (QIP) system; and
performing a first computation based on the plurality of trapped ions during an emission of the saturation beam at the first intensity.

2. The method of claim 1, further comprising:
selecting a second intensity for the saturation beam, wherein the second intensity is different than the first intensity;
emitting the saturation beam at the second intensity; and
performing a second computation based on the plurality of trapped ions during the emission of the saturation beam at the second intensity.

3. The method of claim 1, wherein selecting the wavelength comprises selecting the wavelength such that the emission of the saturation beam does not degrade a fidelity of the first computation based on the plurality of trapped ions of the QIP system.

4. The method of claim 1, wherein selecting the first intensity comprises selecting the first intensity such that the emission of the saturation beam does not degrade a fidelity of the first computation based on the plurality of trapped ions of the QIP system.

5. The method of claim 1, wherein the angle is 90° from the surface of the ion trap.

6. The method of claim 1, further comprising:
measuring an unwanted effect associated with the emission of the saturation beam; and
applying a counter light beam to reduce or eliminate the unwanted effect based on the measurement.

7. The method of claim 1, wherein selecting the wavelength comprises selecting the wavelength that does not change states of the plurality of trapped ions or drive light shifts between qubit states associated with the plurality of trapped ions.

8. A non-transitory computer readable medium having instructions stored therein that, when executed by a processor of quantum information processing (QIP) system, cause the processor to:

select a wavelength for a saturation beam;

select a first intensity for the saturation beam;

cause a light source to emit the saturation beam at the first intensity, at an angle with respect to a surface of an ion trap, toward the surface of the ion trap, wherein the ion trap includes a plurality of trapped ions associated with a quantum information processing (QIP) system; and perform a first computation based on the plurality of trapped ions during an emission of the saturation beam at the first intensity.

9. The non-transitory computer readable medium of claim 8, further comprising instructions for:

selecting a second intensity for the saturation beam, wherein the second intensity is different than the first intensity;

causing the light source to emit the saturation beam at the second intensity; and performing a second computation based on the plurality of trapped ions during the emission of the saturation beam at the second intensity.

10. The non-transitory computer readable medium of claim 8, wherein the instructions for selecting the wavelength comprises instructions for selecting the wavelength such that the emission of the saturation beam does not degrade a fidelity of the first computation based on the plurality of trapped ions of the QIP system.

11. The non-transitory computer readable medium of claim 8, wherein the instructions for selecting the first intensity comprises instructions for selecting the first intensity such that the emission of the saturation beam does not degrade a fidelity of the first computation based on the plurality of trapped ions of the QIP system.

12. The non-transitory computer readable medium of claim 8, wherein the angle is 90° from the surface of the ion trap.

13. The non-transitory computer readable medium of claim 8, further comprising instructions for:

measuring an unwanted effect associated with the emission of the saturation beam; and applying a counter light beam to reduce or eliminate the unwanted effect based on the measurement.

14. A quantum information processing (QIP) system, comprising:

a light source configured to emit a saturation beam at a first intensity, at an angle with respect to a surface of an ion trap, toward a surface of an ion trap, wherein the ion trap includes a plurality of trapped ions associated with the QIP system; and a controller configured to:

select a wavelength for the saturation beam;

select the first intensity for the saturation beam;

perform a first computation based on the plurality of trapped ions during an emission of the saturation beam at the first intensity.

15. The QIP system of claim 14, wherein:

the light source is further configured to emit the saturation beam at a second intensity; and the controller is further configured to:

select the second intensity for the saturation beam, wherein the second intensity is different than the first intensity; and perform a second computation based on the plurality of trapped ions during the emission of the saturation beam at the second intensity.

16. The QIP system of claim 14, wherein selecting the wavelength comprises selecting the wavelength such that the emission of the saturation beam does not degrade a fidelity of the first computation based on the plurality of trapped ions of the QIP system.

17. The QIP system of claim 14, wherein selecting the first intensity comprises selecting the first intensity such that the emission of the saturation beam does not degrade a fidelity of the first computation based on the plurality of trapped ions of the QIP system.

18. The QIP system of claim 14, wherein the angle is 90° from the surface of the ion trap.

19. The QIP system of claim 14, wherein the controller is further configured to measure an unwanted effect associated with the emission of the saturation beam; and further comprising a second light source configured to apply a counter light beam to reduce or eliminate the unwanted effect based on the measurement.

20. The QIP system of claim 14, wherein the controller is further configured to select the wavelength that does not change states of the plurality of trapped ions or drive light shifts between qubit states associated with the plurality of trapped ions.

* * * * *